(12) United States Patent
Roy et al.

(10) Patent No.: US 9,176,967 B2
(45) Date of Patent: Nov. 3, 2015

(54) FILE LOAD BALANCING IN AN N-LEVEL DIRECTORY TREE OF A DATA STORAGE SYSTEM

(71) Applicant: Oracle International Corporation, Redwood City, CA (US)

(72) Inventors: Michael Lesile Roy, Westminster, CO (US); Patrick James Tomsula, Arvada, CO (US); Keith Radebaugh, Thornton, CO (US)

(73) Assignee: Oracle International Corporation, Redwood City, CA (US)

( * ) Notice: Subject to any disclaimer, the term of this patent is extended or adjusted under 35 U.S.C. 154(b) by 326 days.

(21) Appl. No.: 13/854,742

(22) Filed: Apr. 1, 2013

(65) Prior Publication Data

US 2014/0297701 A1  Oct. 2, 2014

(51) Int. Cl.
*G06F 17/30* (2006.01)

(52) U.S. Cl.
CPC ................................ *G06F 17/30091* (2013.01)

(58) Field of Classification Search
CPC ................................................ G06F 17/30091
See application file for complete search history.

(56) References Cited

U.S. PATENT DOCUMENTS

| 5,778,374 | A * | 7/1998 | Dang et al. ............................ 1/1 |
| 6,389,427 | B1 * | 5/2002 | Faulkner ........................ 707/741 |
| 7,430,570 | B1 * | 9/2008 | Srinivasan et al. .................... 1/1 |
| 7,774,391 | B1 * | 8/2010 | Le et al. ......................... 707/822 |
| 2004/0221019 | A1 * | 11/2004 | Swildens et al. ............... 709/217 |
| 2004/0260861 | A1 * | 12/2004 | Serizawa et al. .................. 711/4 |
| 2005/0210523 | A1 * | 9/2005 | Parnell et al. .................... 725/97 |
| 2007/0136328 | A1 * | 6/2007 | Carro ............................. 707/100 |
| 2007/0168364 | A1 * | 7/2007 | Douceur et al. .............. 707/100 |
| 2008/0154978 | A1 * | 6/2008 | Lemar ............... G06F 17/30123 1/1 |

* cited by examiner

*Primary Examiner* — Apu Mofiz
*Assistant Examiner* — Jared Bibbee
(74) *Attorney, Agent, or Firm* — Polsinelli PC

(57) ABSTRACT

Implementations of the present disclosure involve a system and/or method for storing one or more data files in an n-level directory tree of a data storage system. In general, the system and/or method computes an n-byte value from a data file name which is used to create a directory path in the data storage system, where parts of the n-byte value are used to form each directory name in the directory path. Storage and retrieval of a data file is performed by storing in or retrieving data files from the computed directory. In one embodiment, the calculated n-byte value is obtained by computing the value with a cyclic redundancy check (CRC) algorithm. Use of the CRC algorithm to compute the directory path provides a balanced set of directories and number of data files that is repeatable such that location and retrieval of the data file is accomplished without the need to search through each directory of the system.

17 Claims, 5 Drawing Sheets

FILE LOAD BALANCING IN AN N-LEVEL DIRECTORY TREE OF A DATA STORAGE SYSTEM

FIELD OF THE DISCLOSURE

Aspects of the present invention relate to computing systems and, more particularly, aspects of the present invention involve file management in virtual tape data storing systems.

BACKGROUND

Computers are ubiquitous in today's society. They come in all different varieties, such as mainframes, personal computers, dedicated control systems, personal digital assistants, cell phones, and many others. As computers become more commonplace, there is an ever increasing need for the storage of very large amounts of data. One example of a high-capacity data storage system involves a physical tape drive system composed of tape cartridges for storing data and tape drives for accessing that data. However, such physical tape systems can require large storage rooms and/or high-cost retrieval mechanisms and are cost prohibitive to some users of the physical tape drive system. In response, virtual tape systems have been developed that emulate the storage capacity of several million physical tapes and several hundred drives as their virtual counterparts in a single system composed of multiple computer servers.

In general, virtual tape storage systems store data that previously would have been stored on physical tapes in a disk file-system directory. Storage of data onto physical tape requires locating a blank tape cartridge, loading it into a tape drive and writing the data to the tape cartridge via the tape drive. Retrieval of data stored on a physical tape requires locating the tape cartridge containing the data, loading it into a tape drive, and reading the data from the tape cartridge using the tape drive. In contrast, storage of the data in a virtual tape storage system includes choosing a location to store the data within the file-system directory, creating the files needed to emulate the tape cartridge and writing the data into those files. Retrieval of data stored in a virtual tape storage system includes locating the files that emulate the tape cartridge, reading and transmitting the retrieved data electronically to the requesting system. Further, virtual tape systems can replace or store the contents of 1 million or more physical tapes. However, due to the high capacity of the virtual tape system, retrieval of specific data within the virtual tape system may become complicated and time-consuming as the resulting several million files are analyzed to locate the intended data file.

In particular, it may be difficult to choose a location or find the location for a particular virtual tape in a virtual tape storage system storing 1 million virtual tapes in a file-system. For example, the virtual tape system may store all 1 million virtual tapes in a single directory of the file-system. In another example, each virtual tape may be stored in a unique directory such that the virtual tape system would include 1 million directories or more. In either case, writing or reading of a single virtual tape within the storage system would be time consuming for the server's operating system which would need to search through its own data for the files or directories until the desired virtual tape files are located. With some other arrangements of directories or files, choosing a location may take a prohibitively long amount of time and become progressively worse as more virtual tapes are added or stored on the system. Similarly, searching for the virtual tape files may take a prohibitively long time. Thus, it is with these and other issues in mind that various aspects of the present disclosure were developed.

SUMMARY

One implementation of the present disclosure may take the form of a data storage system. The data storage system comprises a computer-readable medium configured to store a plurality of directories and a plurality of data files, at least one input/output (I/O) port configured to receive a data file and a data file identifier and at least one processor configured to execute one or more computer-readable instructions. When the instructions are executed, the processor performs the operations of receiving the data file and the associated data file identifier corresponding to the data file, obtaining a directory address from the file identifier by converting the file identifier into at least one byte value and storing the data file in a first directory of the plurality of directories, the first directory corresponding to the directory address.

Another implementation of the present disclosure may take the form of a method for retrieving a data file from a data storage system. The method may include the operations of receiving at a data storage device a data file identifier corresponding to a data file stored in a data storage device, the data file identifier received from a requesting device, converting the data file identifier into a byte string address comprising at least two bytes and parsing the byte string address into at least a first address byte and a second address byte. The method may also include the operations of identifying a directory of the data storage device from the first address byte and the second address byte, searching the identified directory for a data file corresponding to the data file identifier and transmitting the data file to the requesting device through an input/output port of the data storage system.

DETAILED DESCRIPTION

Figure 1:
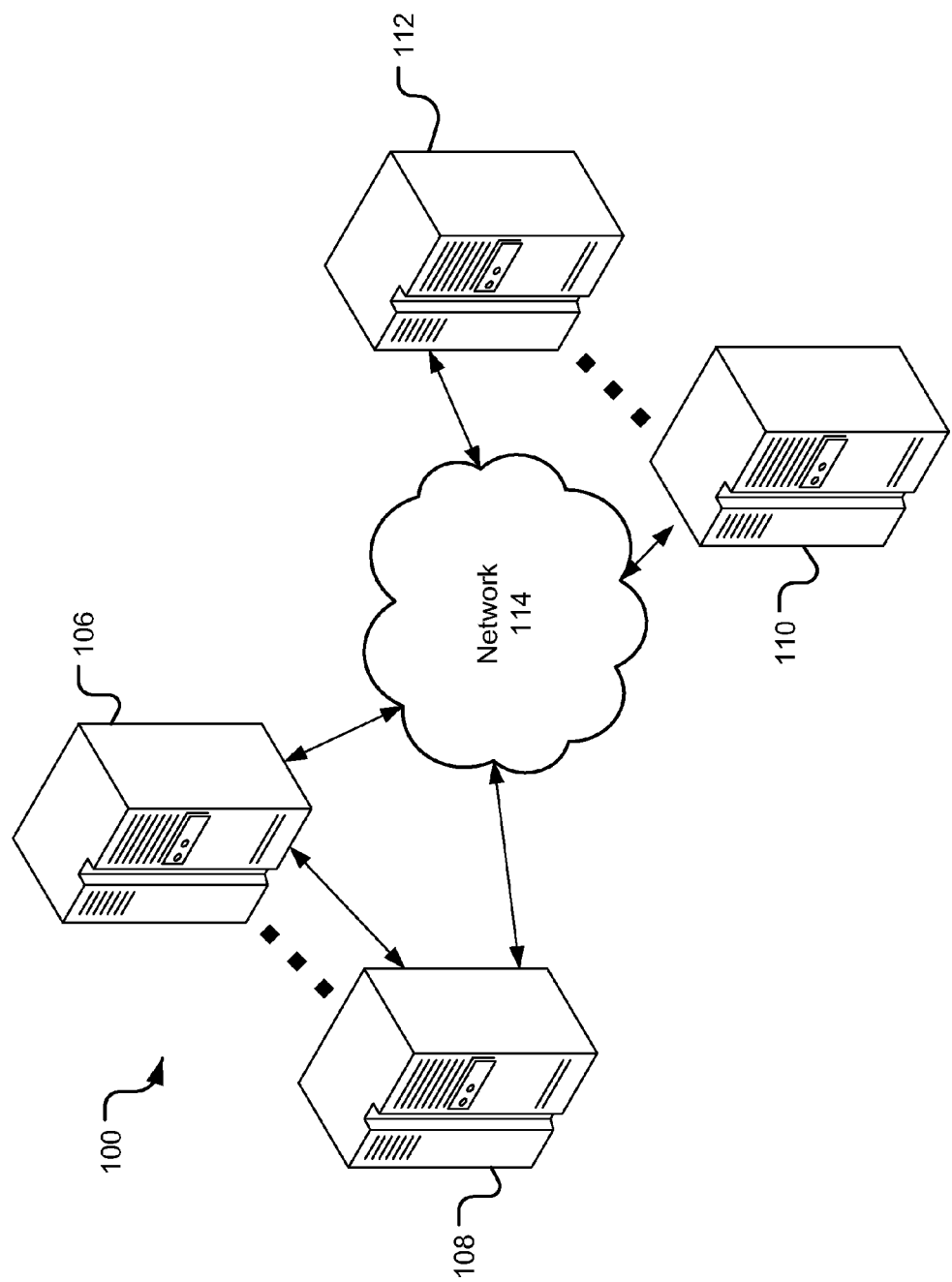
FIG. 1 illustrates an example network environment that may implement various systems and methods of the present disclosure.

Implementations of the present disclosure involve a system and/or method for storing one or more virtual tapes or files in an n-level directory tree of a data storage or virtual tape storage system. In a virtual tape storage system, each virtual tape may be stored as several files, referred to as virtual tape files. The virtual tape storage system may include several million virtual tapes (and related virtual tape files) that are stored in such a manner within the virtual tape storage system that assigning the location of a received virtual tape or finding the location of a previously stored virtual tape is conducted quickly. In one particular embodiment described herein, the virtual tape storage system allocates a large number of virtual tapes and/or virtual tape files to a reasonable number of directories in a balanced manner such that no directory includes an inordinate number of the stored virtual tapes or files. Further, the virtual tape storage system includes a fast, reliable method for choosing or finding a directory path at which virtual tape files are stored based on a virtual tape identifier.

In general, the system and/or method described herein computes an n-digit value from a virtual tape identifier, such as a virtual tape name or file name, where the n-digit value corresponds to a directory in the virtual tape storage system. In one embodiment, the virtual tape storage system computes a two-byte value from a received virtual tape name and stores/retrieves the virtual tape in a directory corresponding to the calculated value. In this example, the virtual tape storage system may be configured as a two-level directory tree, where each level is identified by a two-byte value. Storage and/or retrieval of the virtual tape is performed by using the calculated two-byte value to determine a directory within the directory tree corresponding to the calculated two-byte value from the virtual tape identifier. In this manner, stored virtual tapes may be balanced throughout the directories of the n-level directory tree of the virtual tape storage system. Further, although the example provided includes a two level directory tree corresponding to a two-byte value, any number of levels and byte values may be used as the structure of the directory tree in the virtual tape storage system, as explained in more detail below.

In one embodiment, the calculated two-byte value is obtained by the virtual tape storage system through a cyclic redundancy check (CRC) algorithm. In particular, one embodiment uses a 16-bit CRC algorithm to calculate a two-byte value from a virtual tape identifier provided to the virtual tape storage system by a user requesting storing or retrieval of a virtual tape. Through the use of the CRC algorithm, a resulting two-byte value is calculated that corresponds to a directory in the virtual tape storage system. As described, the two-byte value may then be used to identify a corresponding directory in which the virtual tape files may be stored. Further, such two-byte value is rarely repeated for similar virtual tape identifiers. Since the resulting two-byte values are rarely repeated, the virtual tapes may be distributed through the directory tree so that no single directory includes an inordinate number of stored virtual tape files. Furthermore, in one embodiment the number of directories at any level is limited to a reasonable number by the total number of unique values of a byte. The CRC algorithm produces the same result for the same input, so finding the location of a previously stored virtual tape involves a single computation rather than a search through each directory of the system until the virtual tape is located.

It should be noted that the embodiments discussed herein are generally described as relating to virtual tape storage systems. However, many of the embodiments described apply to any type of computing system that includes a data storage system. For example, the methods or systems described herein may apply to a personal computer that stores one or more data files. In another example, the methods or systems apply to a data storage server that stores one or more data files. Thus, although discussed below in relation to a "virtual tape storage system", any data storage system may use the systems and methods described herein. Similarly, any discussion of a "virtual tape" or "virtual tape file" also incorporates any type of data file or file including computer-readable data that can be stored in a computer-readable memory device. Also, any discussion of a "virtual tape identifier" or "file identifier" applies equally to a data file identifier or other identification of a group of computer-readable data.

FIG. 1 illustrates an example network environment 100 that may implement various systems and methods of the presently disclosed technology. As can be understood from FIG. 1, one or more mainframe computers 110, 112 may be connected to one or more storage appliances 106, 108. In one example, the one or more storage appliances are virtual tape storage systems. One or more clients 110, 112 may have a need for data, files or virtual tapes that are stored on one of the storage appliances 106, 108. The clients 110, 112 may connect to the storage appliances 106, 108 using the network 114 and request the data. Similarly, the clients 110, 112 may provide one or more virtual tapes to be stored within the storage appliances 106, 108. Although FIG. 1 provides as an example network environment 100 that may implement the present disclosure, it should be appreciated that any computing system that stores one or more virtual tapes may utilize the systems and/or methods described herein. Thus, the network environment 100 may include a single server up to a network that includes several mainframe computers or many servers.

Figure 2:
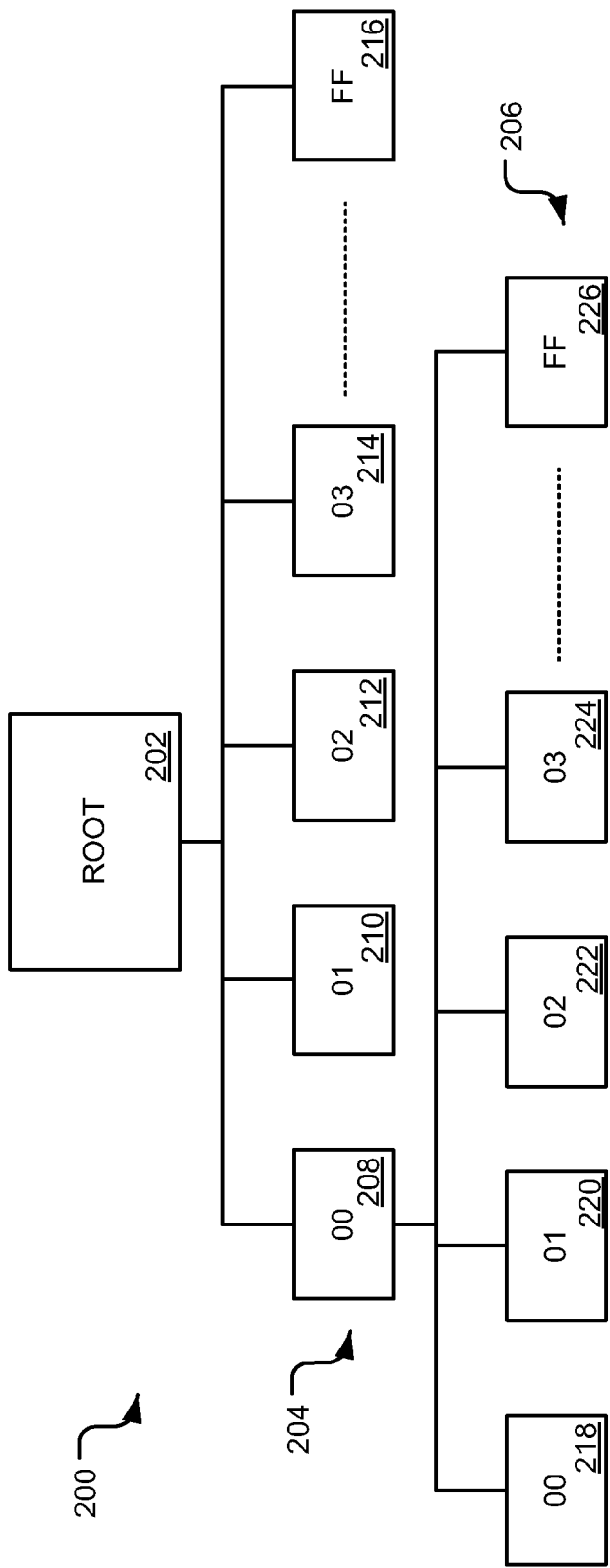
FIG. 2 is a block diagram illustrating one example of an n-level directory tree for a virtual tape storage system utilizing a two-byte value to identify each directory in the directory tree.

FIG. 2 is a block diagram illustrating one example of an n-level directory tree 100 for a data storage system. The n-level directory tree 200 may be a directory structure utilized by any of the components of the environment 100 illustrated in FIG. 1. Thus, the storage appliances 106, 108 and/or the client devices 110, 112 may include a directory structure illustrated in FIG. 2 and discussed below. The particular directory illustrated in FIG. 2 and discussed throughout this disclosure is a two-level directory tree 200. However, the embodiments discussed herein could apply to a directory tree with any number of levels, such as a three-level directory tree or a four-level directory tree, and so on. Further, although only a single directory tree stemming from a root directory 202 is illustrated in FIG. 2, a data storage system implementing one or more of the features discussed herein may include any number of directory trees stemming from any number of root directories, as determined by the data storage system. The use of the directory tree 200 of FIG. 2 is therefore provided throughout the disclosure for simplicity in describing the envisioned embodiments.

The two-level directory tree 200 of FIG. 2 includes a root directory 202, a first level group of directories 204 and a second level group of directories 206. Each box in FIG. 2 represents a directory in the virtual tape storage system in which a virtual tape or data files may be stored. As described in more detail below, storage of a virtual tape may occur in any type of storage medium associated with the virtual tape storage system, such as volatile or non-volatile memory. In general, the directory tree 200 is identified by the root directory 202. As mentioned above, a virtual tape storage system may include any number of root directories.

As illustrated, the two-level directory tree 200 includes a first level group of directories 204 under the root directory name 202. In the embodiment shown, each directory in the first level group of directories 204 is identifiable by a two-digit byte name or designation. For example, first level group of directories 204 includes a directory 208 designated with a "00" name or identifier, a directory 210 designated with a "01" name or identifier and so on, with each identifier corresponding to a two-digit byte value. In one embodiment, each byte value may be represented by eight bits such that each directory is identifiable by a sixteen bit value. Although shown as being identified through a byte value, in other embodiments the directories may be identified through any other type of identifier, such as an alphanumeric string, binary number, hexadecimal number and the like. Also, the first level group of directories 204 may include any number of directories designated with a unique identifier. In the embodiment shown in FIG. 2, first level group of directories 204 includes 256 directories each designated by a byte value identifier ("00" through "FF").

The two-level directory tree 200 further includes a second level group of directories 206. In particular, each directory of the first level group of directories 204 may include any number of sub-directories 206 corresponding to the directory of the first level group of directories. Thus, directory 208 of the first level group of directories 204 may include any number of sub-directories 206, while directory 210 may also include any number of sub-directories. In the example shown in FIG. 2, each sub-directory under first level directory 204 is identifiable by a two-digit byte name or designation. For example, second level group of directories 206 under first level directory "00" 208 includes a directory 218 designated with a "00" name or identifier, a directory 220 designated with a "01" name or identifier and so on, with each identifier corresponding to a two-digit byte value. Similar to the first level group of directories, the sub-directories of second level group of directories 208 may be identified through any type of identifier, such as a binary or hexadecimal number. Also, each directory of the first level group of directories 204 may include any number of sub-directories designated with a unique identifier. In the embodiment shown in FIG. 2, second level group of sub-directories 206 under first level directory "00" 208 includes 256 directories each designated by a two-digit byte value identifier ("00" through "FF"). As such, each directory in the first level group of directories 204 includes 256 sub-directories ("00" through "FF"), providing 65,536 possible directories in the directory tree of FIG. 2.

As mentioned, the directory tree 200 of FIG. 2 is but one example of the structure of a directory tree that can be utilized by the systems and methods described herein. In this particular embodiment, a directory is identified by a two-byte value. For example, a particular directory 222 is identified by directory address "00" and sub-directory address "02". To access or store files in this directory, a computing device may provide the two-byte directory address of "00,02" to instruct the data storage system to access or store one or more files in directory 222. In this manner, the two-byte address is used to identify a directory within the directory tree 200 to access or store files. As should be appreciated, other embodiments of the directory tree 200 may use more or fewer bytes in the directory identifier, or other numerical values or words, to identify or distinguish the directories maintained within the directory tree. The directory tree 200 of FIG. 2 is but one example of a directory tree of the data storage system of the present disclosure.

As mentioned above, an ideal virtual tape storage system includes a reasonable number of virtual tapes or virtual tape files stored in a reasonable number of directories in a balanced manner such that no directory includes an inordinate amount of the stored virtual tapes. As should be appreciated, a large virtual tape storage system storing several million virtual tapes may store the virtual tapes in such a way that later location of the virtual tapes in the directories of the system for retrieval becomes prohibitive. For example, the virtual tape storage system may store one million virtual tapes in directory 224 of the directory of FIG. 2 such that any later retrieval of a virtual tape stored in that directory would require scanning through at least some of the several million virtual tapes until the desired virtual tape is located. In contrast, a balanced load management scheme for the virtual tape storage system that balances the virtual tapes between the various directories in the directory tree may minimizes the number of virtual tapes, virtual tape files and/or directories that are searched to retrieve a particular virtual tape.

Figure 3:
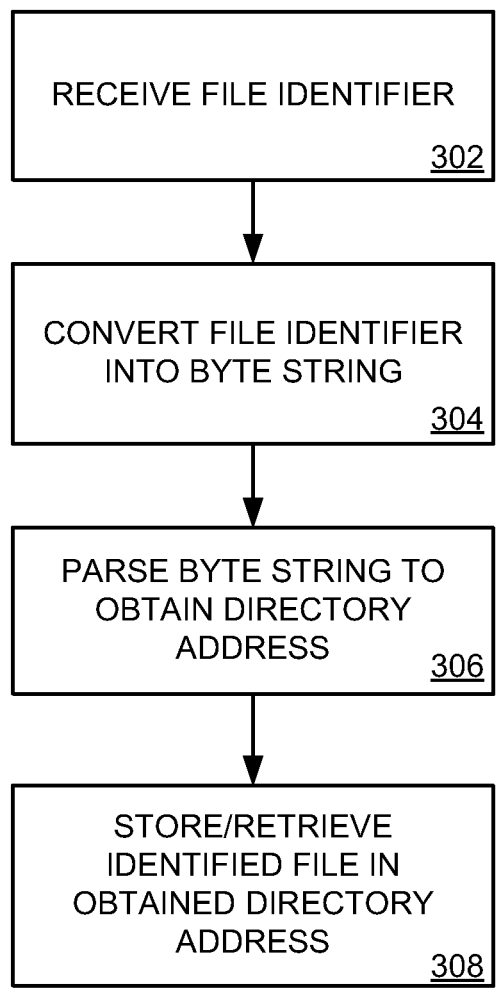
FIG. 3 is a flow chart illustrating a method for a virtual tape storage system to identify a directory in an n-level directory tree to store and/or retrieve a stored virtual tape.

FIG. 3 is a flow chart illustrating a method for a virtual tape storage system to identify a directory in an n-level directory tree to store and/or retrieve a virtual tape based on an identifier of the virtual tape. In general, the operations of FIG. 3 may be performed by a data storage system, such as a virtual tape storage system or a data storage server. Beginning in operation 302, the virtual tape storage system may receive a virtual tape identifier from a virtual tape requesting device. The virtual tape identifier may be any type of number value or string of characters that identifies a virtual tape to be stored in or retrieved from the virtual tape storage system. In one particular embodiment, the virtual tape identifier is a string of six alphanumeric characters.

In operation 304, the virtual tape storage system converts the received virtual tape identifier to a byte string of one or more byte values. For example, as described in more detail below in relation to the flowchart of FIG. 4, the six character virtual tape identifier is converted into a two-byte value in operation 304. In other embodiments, the virtual tape identifier may be converted into any number of bytes or bits that aid in identifying a directory in the virtual tape storage system for storing the virtual tape. In yet another embodiment, the virtual tape identifier may be converted into a string of alphanumeric characters that identify a directory in the virtual tape storage system. In general, the virtual tape name may be converted into a string of any number and type of characters that aid in identifying a directory in the virtual tape storage system that is used to store or retrieve the virtual tape.

In operation 306, the byte string is parsed to obtain the directory identifier. For example, the received virtual tape identifier may be converted into a two-byte string of "0002" in operation 304 above. This byte string may then be utilized by the virtual tape storage system to identify a particular directory in the directory tree of the storage system. For example, as discussed above with reference to FIG. 2, each directory in the directory tree 200 can be identified by a two-byte string, with one byte identifying a first level directory and the second byte identifying a sub-directory within the first level directory. Thus, the byte string "0002" identified in operation 304 may be parsed in operation 306 into the directory address of "00,02", with byte "00" corresponding to a first level directory and byte "02" corresponding to a sub-directory within first level directory "00". As should be appreciated, the directory identifiers in the directory tree determine the granularity into which the byte string is parsed. For example, a three-level directory tree that identifies each directory with a byte may parse the byte string into three bytes to obtain the directory address.

In another embodiment, the byte string obtained in operation 304 may include more or fewer bytes than correspond to a directory address for a particular directory tree structure. For example, the calculated byte string may include three bytes, where only two bytes are needed to identify a directory in the directory tree. In these examples, one or more bytes may be added or removed from the calculated byte string to identify a directory in the directory tree in which the virtual tape file may be stored or retrieved.

Utilizing the parsed byte string that corresponds to a directory of the directory tree, the virtual tape storage system may then store or retrieve the virtual tape in the identified directory in operation 308. Continuing the above example, the parsed calculated byte string provides a directory address of "00,02". Thus, when the virtual tape is to be stored in the data storage system, the virtual tape may be stored in the directory identified by the bytes "00,02". In the case where the virtual tape is to be retrieved, the virtual tape storage system may access directory "00,02" and search the virtual tapes in the identified directory until the correct virtual tape is located and retrieved. In other words, because the conversion of the virtual tape identifier is repeatable and predictable, the virtual tape identifier will provide the same byte string corresponding to a directory. Thus, whether the virtual tape is being stored in or retrieved from the virtual tape storage system, the directory address will remain the same from when the virtual tape is stored to when the virtual tape is retrieved (if the virtual tape identifier remains the same). Therefore, at any later point after a virtual tape is stored, the virtual tape storage system may determine which directory the virtual tape is stored in without having to search each directory for the virtual tape.

In addition, the virtual tapes may be distributed at least partially evenly across the many directories of the directory tree, depending on the functionality of the conversion of the virtual tape identifier to provide a seemingly random, but repeatable, selection of a directory in the directory tree. For example, a conversion method for converting the virtual tape identifier to a byte string that tends to coalesce similarly named virtual tapes into one or more directories would not evenly disperse the virtual tapes within the directory tree. This may overload a particular directory with a majority of virtual tapes such that, even if the virtual tape is identified as being located within a particular directory, searching for the virtual tape within that particular directory may be time consuming as the numerous virtual tapes stored in that directory are searched. For example, a virtual tape storage system may receive several virtual tapes that differ in identifier by a single character, such as "root01", "root02", "root03", "root04", and so on. In this example, a conversion function may provide the same or a similar byte string for each of these virtual tapes, such as byte string "0000" such that these virtual tapes would be later stored in the same directory (namely directory "00, 00"). If too many such virtual tapes are received by the virtual tape storage system for storing, then directory "00,00" may include several million virtual tapes such that retrieval of any one virtual tape from the directory is time-consuming.

Figure 4:
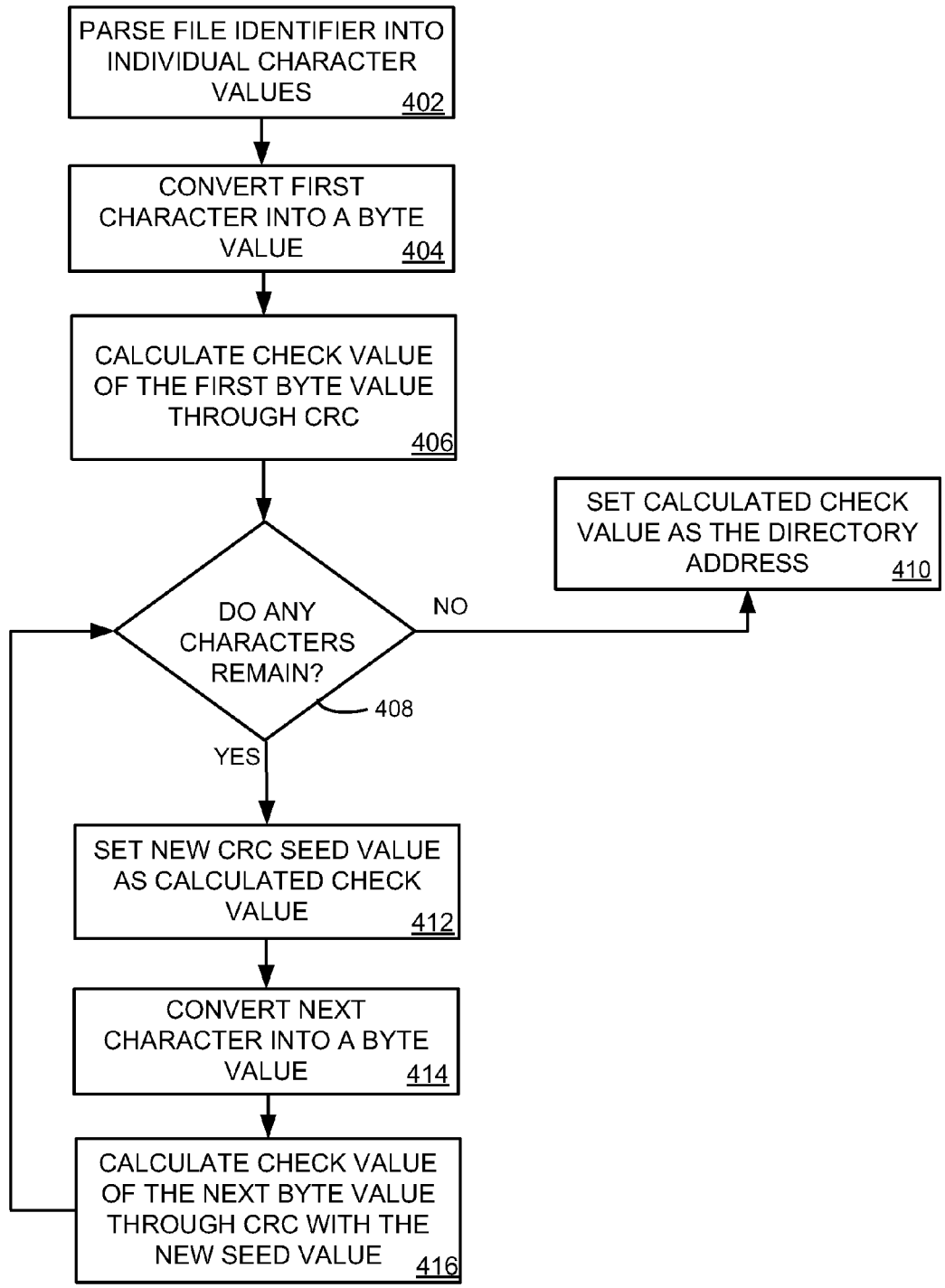
FIG. 4 is a flow chart illustrating a method for a virtual tape storage system to convert a virtual tape identifier or file identifier into a two-byte value corresponding to a directory name in an n-level directory tree in which the virtual tape can be stored and/or retrieved.

Thus, a conversion method to convert the virtual tape identifier into a byte string that provides at least a partially even distribution of the virtual tapes into the available directories may aid in minimizing the retrieval time for a single virtual tape from the virtual tape storage system. FIG. 4 is a flow chart illustrating a method for a virtual tape storage system to convert a virtual tape name into a two-byte value corresponding to a directory name in an n-level directory tree in which the virtual tape can be stored that partially balances the virtual tapes among the available directories of the virtual tape storage system. Thus, in one embodiment, the operations of FIG. 4 are performed by the virtual tape storage system to determine a directory to store or retrieve a virtual tape. In general, the operations of FIG. 4 are performed during operation 304 of FIG. 3.

Beginning in operation 402, the virtual tape storage system parses the virtual tape identifier into single characters. For example, if the virtual tape identifier is a six-character string of alphanumeric characters, the data storage system parses the six-character string into six single characters. In other embodiments, the virtual tape storage system may parse the virtual tape identifier into any number of characters. For example, the virtual tape storage system may parse the virtual tape identifier into a series of two-character strings, three-character strings, four-character strings, and so on. Further, in some embodiments, if the virtual tape identifier is a particular number of characters, the virtual tape storage system may ignore one character, such as the first or last character, or add a default character to the virtual tape identifier to create a virtual tape identifier with a minimum or acceptable number of characters. For example, a virtual tape identifier of "root0" can be altered by the virtual tape storage system to "0root0" prior to parsing the virtual tape identifier into two character strings. In general, the default character added to the virtual tape identifier may be any character and may be located anywhere in the virtual tape identifier to create a virtual tape identifier with a desired number of characters. In addition, by adding characters to the virtual tape identifier, the method of FIG. 4 is performed more times which may result in a more random distribution of virtual tapes in the directory tree.

The virtual tape storage system converts a first character from the parsed virtual tape identifier into a byte string in operation 404. For example, the virtual tape storage system may convert a first alphanumeric character into a corresponding byte value by converting the alphanumeric character into its American Standard Code for Information Interchange (ASCII) equivalent byte value. In general, however, any method may be employed by the virtual tape storage system to convert the characters into a byte value in operation 404.

In operation 406, the virtual tape storage system calculates a check value for the first byte. In one particular example, the virtual tape storage system utilizes a cyclic redundancy check (CRC) algorithm to calculate the check value of the first byte. For example, CRC-16-ANSI polynomial may be used as the CRC polynomial to determine the check value of the first byte in operation 406. In general, a CRC is an error-detecting code commonly used to detect errors in transmitted data. In essence, the CRC applies a polynomial division to the byte string, the remainder of which becomes the check value for the byte string. The polynomial for the division calculation is represented, typically, by a multi-bit value, known herein as a "seed value". In one embodiment of the present disclosure, the seed value for the CRC algorithm applied in operation 406 is a zero value. However, any seed value may be used in operation 406 when calculating the check value.

Although the CRC is typically used to verify the accuracy of a transmitted byte string, the check value may also be used as described herein to calculate a byte string that doubles as a directory address in a directory tree. In use, a CRC-16-ANSI polynomial provides a 16 bit, or two-byte, string as the check value. Other CRC algorithms may provide a check value with more or fewer bits and may be used in conjunction with different embodiments of the present disclosure. For the embodiments provided herein, however, a CRC-16 type algorithm is utilized to provide a two-byte check value.

In addition, although the examples discussed herein utilize a CRC-type algorithm to derive a two-byte check value from the two-byte string, any type of algorithm that converts the two-byte string into a check value may be utilized. It has been discovered, however, that use of a CRC-type algorithm to calculate a check value provides at least a partially balanced approach to storing files within a directory tree.

In operation 408, the virtual tape storage system determines if any characters of the virtual tape identifier remain or have not been processed. For example, a virtual tape identifier may be one character long so that the parsing and conversion of the string occurs only once. In such a case, the virtual tape storage system sets a directory address to store or retrieve the virtual tape identified by the virtual tape identifier as the calculated check value, as shown in operation 410. In other words, the two-byte calculated check value becomes the directory address for a directory in the directory tree of the virtual tape storage system. In this manner, the directory to store a virtual tape or retrieve a virtual tape is determined in a random, but repeatable, fashion to balance the storing of virtual tapes within the directory tree.

If it is determined in operation 408 that additional characters of the file identifier remain to be processed or converted into a byte string, the virtual tape storage system may continue to operation 412. In operation 412, the virtual tape storage system sets the new seed value for the CRC algorithm as the calculated check value. In other words, the virtual tape storage system calculates a check value for the first character of the file identifier and may then use the calculated check value as the seed for a next calculation. Thus, in operation 414, the virtual tape storage system converts a second character from the virtual tape identifier into a byte string, similar to operation 404 above. Once converted, the virtual tape storage system calculates a new check value of the next character using the new seed value in operation 416. Upon calculation of the new check value, the virtual tape storage system again determines if any characters remain from the virtual tape identifier in operation 408. If no more characters remain, the calculated check value is set as the directory address as described above. Otherwise, the next character is obtained and operations 412-416 are repeated until no characters from the virtual tape identifier remain.

The operations of FIG. 4 performed by the virtual tape storage system are described now in relation to the below example. A virtual tape identifier "a01" is received by the virtual tape storage system that identifies a virtual tape to be retrieved from a directory in the virtual tape storage system. The storage system parses the virtual tape identifier "a01" into three characters, namely "a", "0" and "1". A first character "a" is selected and converted into a byte value, such as ASCII value "61". This character is then fed into a CRC algorithm using a seed value of zero. Using the CRC algorithm, the virtual tape storage system calculates a first check value, such as "74DC". Because other characters of the virtual tape identifier remain, the virtual tape storage system converts the next character "0" into a byte value, such as "0". Using the first check value "74DC" as a seed value and the byte value "0", the virtual tape storage system calculates a new check value, such as "1400". Further, because another character of the virtual tape identifier remains, the virtual tape storage system converts the next character "1" into a byte value, such as "1". Using the second calculated check value "1400" as a seed value and the byte value "1", the virtual tape storage system calculates a new check value, such as "D4C1". Because no characters of the virtual tape identifier remain, the virtual tape storage system accesses the directory of the directory corresponding to address "D4C1" and searches that directory for the requested virtual tape. In this manner, the directory may be located to store or retrieve a virtual tape, while balancing the virtual tape storage throughout the directory tree of the virtual tape storage system.

Figure 5:
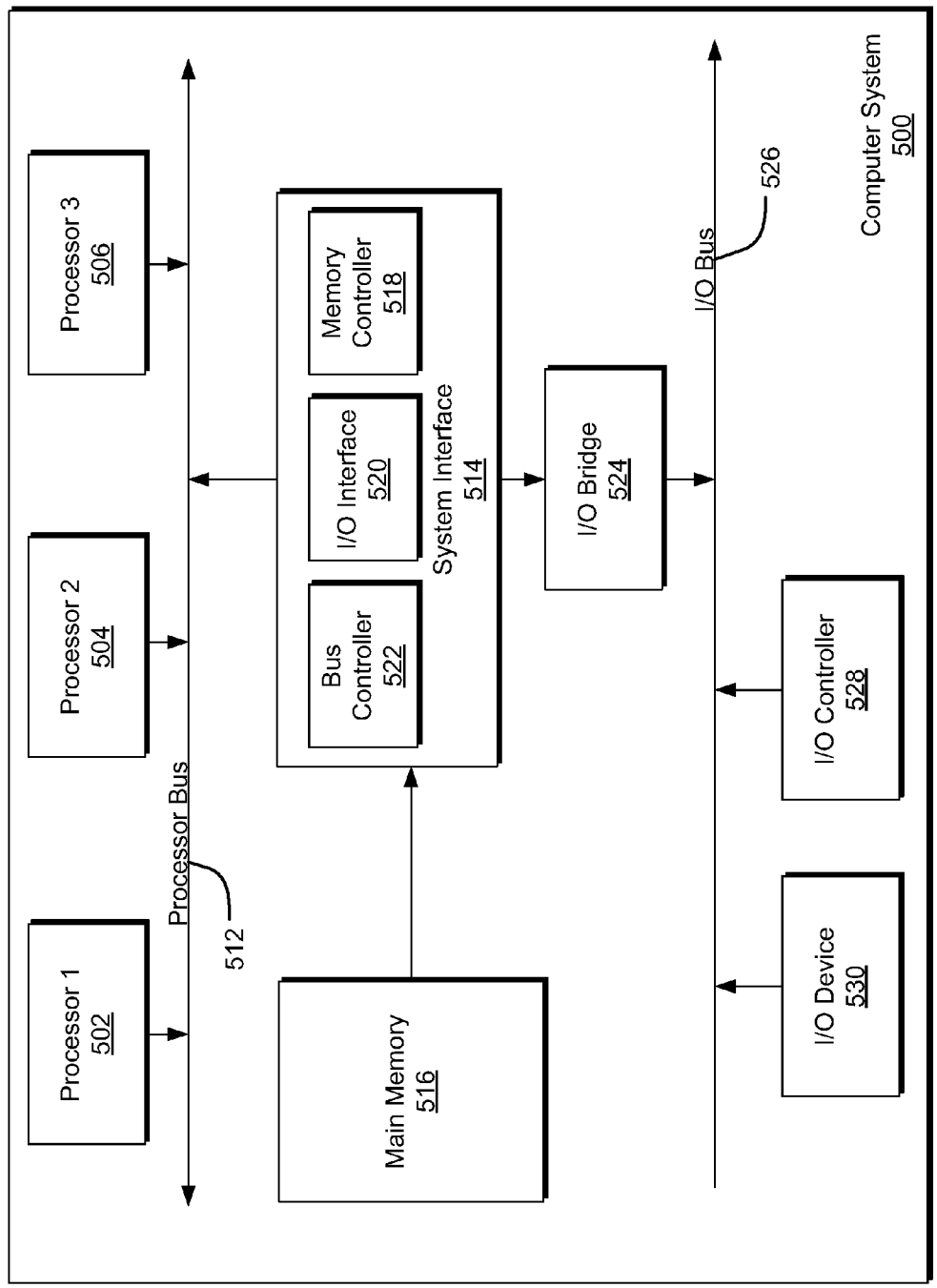
FIG. 5 is a block diagram illustrating an example of a computing system which may be used in implementing embodiments of the present disclosure.

FIG. 5 illustrates a computer system 500 capable of implementing the embodiments described herein. For example, the computer system 500 described in relation to FIG. 5 may be a data storage system, such as a virtual tape storage system or server. The computer system (system) includes one or more processors 502-506. Processors 502-506 may include one or more internal levels of cache (not shown) and a bus controller or bus interface unit to direct interaction with the processor bus 512. Processor bus 512, also known as the host bus or the front side bus, may be used to couple the processors 502-506 with the system interface 514. Processors 502-506 may also be purpose built for processing one or more computer-readable instructions.

System interface 514 may be connected to the processor bus 512 to interface other components of the system 500 with the processor bus 512. For example, system interface 514 may include a memory controller 515 for interfacing a main memory 516 with the processor bus 512. The main memory 516 typically includes one or more memory cards and a control circuit (not shown). System interface 514 may also include an input/output (I/O) interface 520 to interface one or more I/O bridges or I/O devices with the processor bus 512. One or more I/O controllers and/or I/O devices may be connected with the I/O bus 526, such as I/O controller 528 and I/O device 530, as illustrated.

I/O device 530 may also include an input device (not shown), such as an alphanumeric input device, including alphanumeric and other keys for communicating information and/or command selections to the processors 502-506. Another type of user input device includes cursor control, such as a mouse, a trackball, or cursor direction keys for communicating direction information and command selections to the processors 502-506 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506. Main memory 516 also may be used for storing temporary variables or other intermediate information during execution of instructions by the processors 502-506. System 500 may include a read only memory (ROM) and/or other static storage device coupled to the processor bus 512 for storing static information and instructions for the processors 502-506. The system set forth in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 to perform the process steps described herein. In alternative embodiments, circuitry may be used in place of or in combination with the software instructions. Thus, embodiments of the present disclosure may include both hardware and software components.

A machine readable medium includes any mechanism for storing information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 516. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. A data storage system comprising:
a computer-readable medium configured to store a plurality of directories and a plurality of data files;
at least one input/output (I/O) port configured to receive a data file and a data file identifier; and
at least one processor configured to execute one or more computer-readable instructions to perform the operations of:
receiving the data file and the data file identifier corresponding to the data file;
obtaining a directory address from the file identifier by converting the file identifier into at least two byte values, each byte value comprising an 8-bit string; and
storing the data file in a first directory of the plurality of directories, the plurality of directories comprising a first-level plurality of directories and a plurality of sub-directories, wherein a first byte value of the at least two byte values corresponds to one of the first-level plurality of directories and a second byte value of the two byte values corresponds to one of the plurality of sub-directories.

2. The data storage system of claim 1 wherein the data file and data file identifier is received from a user device in communication with the at least one I/O port and wherein the file identifier comprises at least one alphanumeric character.

3. The data storage system of claim 2 wherein the operation of obtaining the directory address from the file identifier comprises adding a default alphanumeric character to the file identifier.

4. The data storage system of claim 3 wherein the operation of obtaining the directory address from the file identifier comprises:
parsing the characters of the file identifier into at least one individual character;
converting the at least one individual character of the file identifier into a particular byte value corresponding to the at least one individual character; and
calculating the directory address from the particular byte value.

5. The data storage system of claim 4 wherein the calculating the directory address operation comprises:
utilizing a cyclic redundancy check (CRC) algorithm to calculate a first check value from the particular byte value; and
setting the directory address to the first check value.

6. The data storage system of claim 4 wherein the converting operation comprises:
determining an American Standard Code for Information Interchange (ASCII) value for the at least one individual character; and
setting the particular byte value to correspond to the ASCII value for the at least one individual character.

7. A method for retrieving a data file from a data storage system comprising:
receiving at a data storage device a data file identifier corresponding to a data file stored in a data storage device, the data file identifier received from a requesting device;
converting the data file identifier into a byte string address comprising at least two bytes, each byte of the byte string address comprising an 8-bit string;
parsing the byte string address into at least a first address byte and a second address byte;
identifying a directory of the data storage device from the first address byte and the second address byte, the first address byte corresponding to one of a first-level plurality of directories and the second address byte corresponding to one of a plurality of sub-directories;
searching the identified directory for a data file corresponding to the data file identifier; and
transmitting the data file to the requesting device through an input/output port of the data storage system.

8. The method of claim 7 wherein the data storage system stores a directory tree comprising the first level plurality of directors and wherein at least one directory of the first level plurality of directories comprises the plurality of sub-directories.

9. The method of claim 8 wherein the data file identifier comprises a plurality of alphanumeric characters.

10. The method of claim 9 further comprising:
selecting a first character from the plurality of alphanumeric characters of the data file identifier; and
converting the first character of the file identifier into a first byte value corresponding to the first character.

11. The method of claim 9 wherein the converting operation comprises:
determining an American Standard Code for Information Interchange (ASCII) value for the first character; and
setting the first byte value to correspond to the ASCII value for the first character.

12. The method of claim 10 further comprising:
utilizing a cyclic redundancy check (CRC) algorithm and a default seed value to calculate a first check value from the first byte value.

13. The method of claim 12 further comprising:
selecting a second character from the plurality of alphanumeric characters of the data file identifier; and
converting the second character of the file identifier into a second byte value corresponding to the second character, the second byte value corresponding to an ASCII value corresponding to the second character.

14. The method of claim 13 further comprising:
setting a CRC seed value to the first check value; and
utilizing the CRC algorithm and the CRC seed value to calculate a second check value from the second byte value.

15. The method of claim 14 wherein the second check value is a two-byte string and the method further comprising:
setting the byte string address equal to the second check value.

16. The method of claim 7 wherein the data file identifier is a name of the corresponding data file.

17. The method of claim 7 wherein the data file is a virtual tape and the data storage system is a virtual tape storage system.

* * * * *